(12) United States Patent
Harvey et al.

(10) Patent No.: US 9,258,990 B1
(45) Date of Patent: Feb. 16, 2016

(54) RODENT TRAP SYSTEM WITH ALARM

(71) Applicants: Ralph Harvey, Kapowsin, WA (US); Thomas Davis, Lakewood, WA (US)

(72) Inventors: Ralph Harvey, Kapowsin, WA (US); Thomas Davis, Lakewood, WA (US)

( * ) Notice: Subject to any disclaimer, the term of this patent is extended or adjusted under 35 U.S.C. 154(b) by 156 days.

(21) Appl. No.: 13/972,020

(22) Filed: Aug. 21, 2013

Related U.S. Application Data

(60) Provisional application No. 61/691,676, filed on Aug. 21, 2012.

(51) Int. Cl.
| | |
|---|---|
| *A01M 23/24* | (2006.01) |
| *A01M 23/26* | (2006.01) |
| *A01M 23/38* | (2006.01) |
| *A01M 23/00* | (2006.01) |

(52) U.S. Cl.
CPC .............. *A01M 23/00* (2013.01); *A01M 23/24* (2013.01); *A01M 23/245* (2013.01); *A01M 23/26* (2013.01); *A01M 23/265* (2013.01); *A01M 23/38* (2013.01)

(58) Field of Classification Search
CPC ... A01M 23/00; A01M 23/24; A01M 23/245; A01M 23/26; A01M 23/265; A01M 23/38
USPC ............................................ 43/88, 90, 92–96
See application file for complete search history.

(56) References Cited

U.S. PATENT DOCUMENTS

| | | | | |
|---|---|---|---|---|
| 1,080,623 | A * | 12/1913 | Brorby | 43/88 |
| 1,176,778 | A * | 3/1916 | Rittelmann | 43/81 |
| 2,554,728 | A * | 5/1951 | Barber | 200/52 R |
| D275,511 | S | 9/1984 | Nagel | |
| 4,517,557 | A | 5/1985 | Agron et al. | |
| 4,719,718 | A * | 1/1988 | Kon | 43/81 |
| 5,154,017 | A | 10/1992 | Disalvo | |
| 5,184,416 | A | 2/1993 | Brewer | |
| 5,477,635 | A | 12/1995 | Orsano | |
| 5,528,853 | A * | 6/1996 | Dufaux et al. | 43/83.5 |
| 6,137,415 | A | 10/2000 | Rast | |
| 6,415,544 | B1 * | 7/2002 | Leyerle et al. | 43/82 |
| 6,508,031 | B1 * | 1/2003 | Johnson et al. | 43/88 |
| 6,574,912 | B1 * | 6/2003 | Johnson | 43/88 |
| 6,775,946 | B2 * | 8/2004 | Wright | 43/61 |
| 7,954,275 | B2 * | 6/2011 | Frisch | 43/81 |
| 8,156,683 | B2 * | 4/2012 | Slotnick | 43/81 |
| 8,933,812 | B2 * | 1/2015 | Clifford | 340/686.1 |
| 8,959,829 | B2 * | 2/2015 | Kay | 43/96 |

* cited by examiner

*Primary Examiner* — David Parsley

(57) ABSTRACT

A rodent trap system for alerting a user that a rodent has been trapped having a base panel, a top surface, three lips extending upwardly from three ends of the base panel wherein the lips create an enclosure, a lid pivotally attached to the second and third lips, an alarm housing on the base panel, a flange extending outwardly from the alarm housing formed by the lips which can pivot; a first half contact on a bottom surface of the flange, a second half contact on the top surface of the base panel, the contacts are connected to the actuator or solenoid and to a speaker in the alarm housing, wherein when the contacts contact each other they send an electrical signal causing the actuator or solenoid to pull a plunger to move the lid to the closed position and causing the speaker to emit the sound.

1 Claim, 5 Drawing Sheets

TOP VIEW

FRONT VIEW

US 9,258,990 B1

RODENT TRAP SYSTEM WITH ALARM

CROSS REFERENCE

This application claims priority to U.S. Patent Application No. 61/691,676, filed Aug. 21, 2012, the specification(s) of which is/are incorporated herein in their entirety by reference.

BACKGROUND OF THE INVENTION

Unfortunately, some rodents that get trapped may drag the trap away only to die later in an unknown location. This requires the homeowner to search for the carcass. The present invention features a novel rodent trap system with an alarm that is activated when the trap is sprung. This allows the homeowner to find the mouse or rat in the trap, preventing the mouse or rat from escaping. In some embodiments, the alarm can alert the homeowner via an Internet system or a mobile phone system.

The present invention may feature a basic model for an average homeowner. The present invention may feature a more advanced model that may have alert features through the Internet system or cell phone system, which may be more beneficial for commercial use.

SUMMARY

The present invention features a rodent trap system with alarm. In some embodiments, the rodent trap system for alerting a user that a rodent has been trapped, said system comprising a base panel having a first end, a second end adjacent to the first end, a third end adjacent to the first end and opposite the second end, and a top surface; a first lip extending upwardly from the first end, a second lip extending upwardly from at least a portion of the second end of the base panel, the portion being at or near the first end of the base panel, and a third lip extending upwardly from at least a portion of the third end of the base panel, the portion being at or near the first end of the base panel, wherein the lips create an enclosure; a lid pivotally attached to the second lip and the third lip, the lid can pivot between at least an open position and a closed position respectively allowing and preventing access to the enclosure formed by the lips, the lid is biased in the open position via a closing means; an alarm housing disposed on the base panel, wherein a speaker is disposed in the alarm housing, the speaker is adapted to emit a sound when activated; a flange extending outwardly from the alarm housing into the enclosure formed by the lips, the flange can pivot between at least a first position wherein the flange hovers above the top surface of the base panel and a gap temporarily exists between the flange and the base panel and a second position wherein the flange is pivoted to the base panel, the flange is biased in the first position; and a first half contact disposed on a bottom surface of the flange and a second half contact disposed on the top surface of the base panel, the second half contact is aligned with the first half contact such that when the flange is pivoted downwardly to the second position the first half contact contacts the second half contact, the contacts are each operatively connected to the closing means and to the speaker, wherein when the contacts contact each other the contacts send an electrical signal to (a) the closing means thereby activating the closing means and causing the closing means to move the lid to the closed position and (b) the speaker thereby activating the speaker and causing the speaker to emit the sound.

In some embodiments, the lips have top edges that are jagged. In some embodiments, the closing means is a solenoid or an actuator.

In some embodiments, the lid comprises a first bar, a second bar attached to the first end of the first bar, and a third bar attached to the second end of the first bar, wherein the bars form a U-shape, the second bar is pivotally attached to the second lip and the third bar is pivotally attached to the third lip.

In some embodiments, the system further comprises bait disposed on a top surface of the flange.

In some embodiments, the contacts are each operatively connected to the contacts and to the alarm via a microprocessor, wherein when the contacts contact each other the contacts send an input signal to the microprocessor whereupon the microprocessor sends a first output command to the closing means thereby activating the closing means and causing the closing means to move the lid to the closed position and a second output signal to the speaker thereby activating the speaker and causing the speaker to emit the sound.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
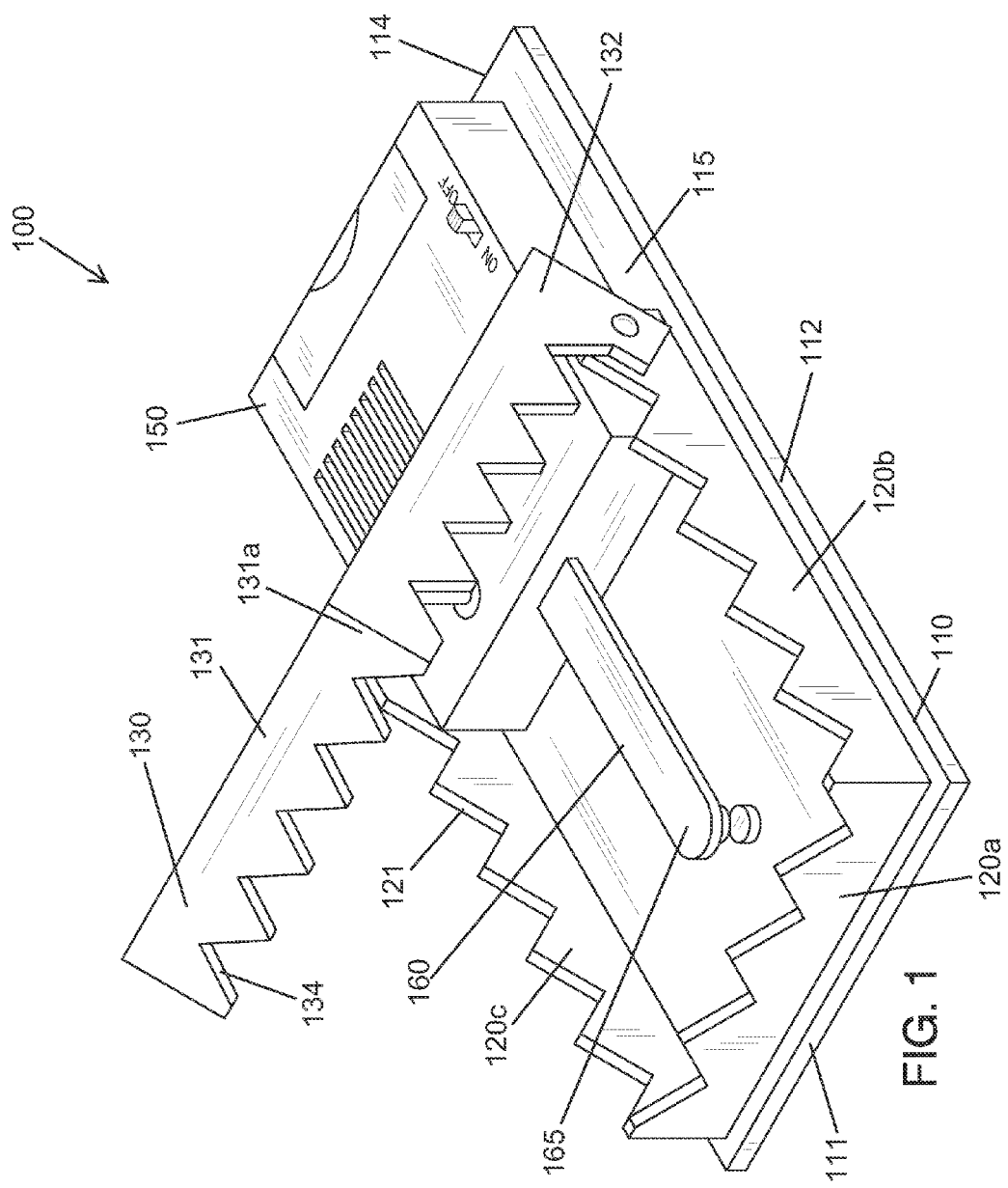
FIG. 1 is a perspective view of the system of the present invention.

Referring now to FIG. 1-6, the present invention features a rodent trap system 100. The system 100 comprises a base panel 110 having a top surface 115, a first end 111, a second end 112 adjacent to the first end 111, a third end 113 adjacent to the first end 111 and opposite the second end 112, and a fourth end 114 opposite the first end 111.

A first lip 120a extends upwardly from the first end 111. A second lip 120b extends upwardly from at least a portion of the second end 112 of the base panel 110. A third lip 120c extends upwardly from at least a portion of the third end 113 of the base panel 110. In some embodiments, the first lip 120a is connected to the second lip 120b and the third lip 120c. Together, the lips 120 create an enclosure. In some embodiments, the lips 120 have top edges 121 that are jagged (e.g., see FIG. 1).

Figure 5:
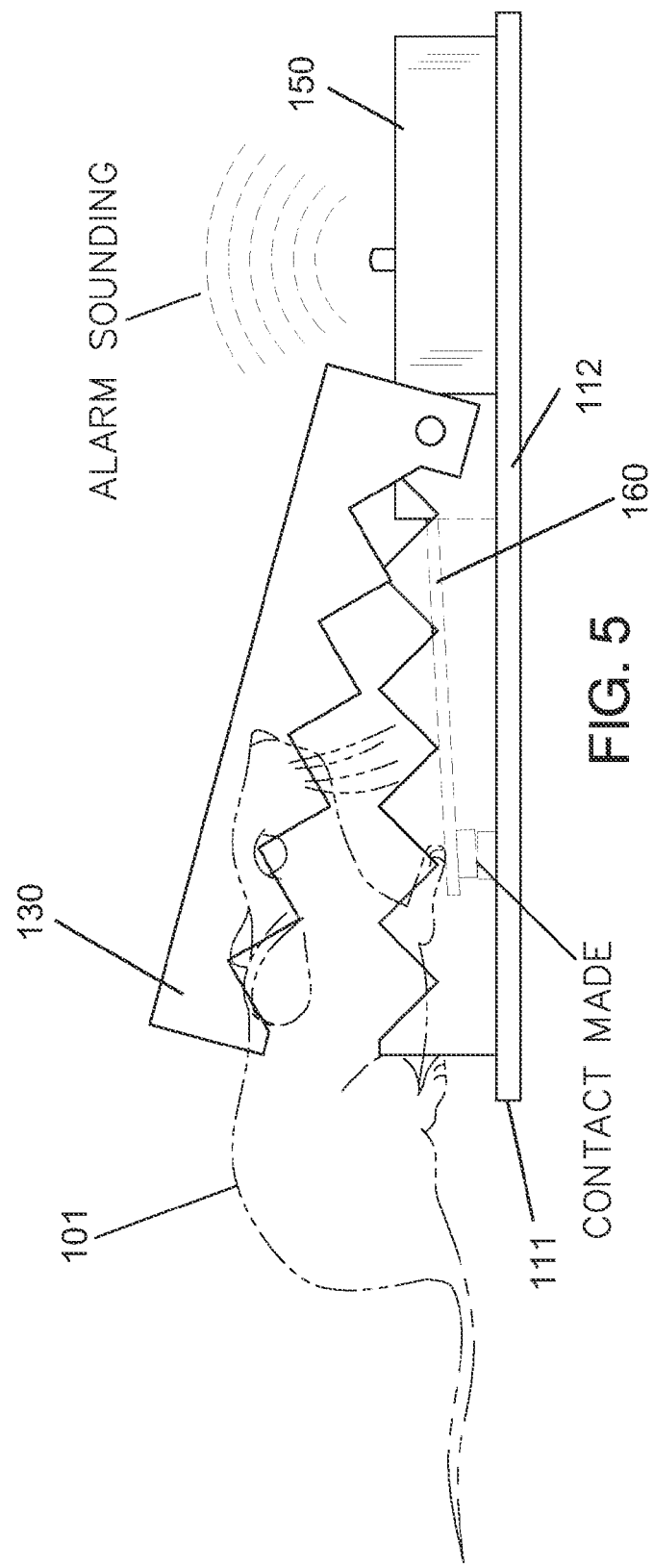
FIG. 5 is an in-use view of the system of the present invention.
Figure 6:
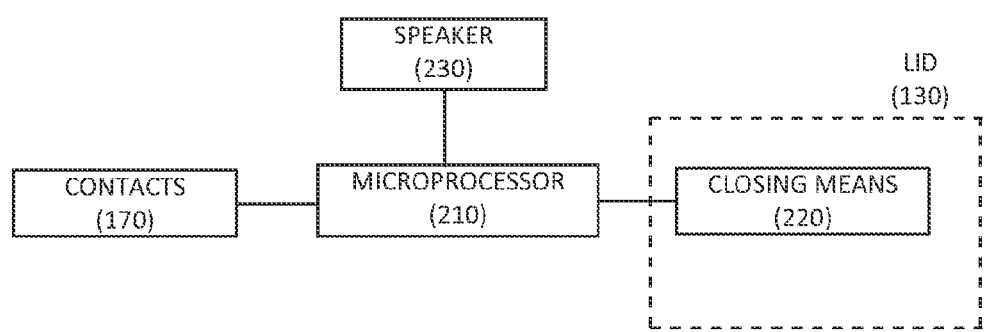
FIG. 6 is a schematic representation of the electrical components of the system of the present invention.

The system 100 further comprises a lid 130 (e.g., a "jaw") adapted to temporarily cover the enclosure formed by the lips 120. The lid 130 is pivotally attached to the lips 120 (e.g., the second lip 120b, the third lip 120c). The lid 130 can pivot between an open position and a closed position respectively allowing and preventing access to the enclosure formed by the lips 120. The lid 130 is biased in the open position (e.g., via a closing means 220, e.g., an actuator, a solenoid, etc). The closing means 220, when activated, can move the lid 130 from the open position to the closed position. The closing means 220 may comprise an actuator, a solenoid, or a combination thereof. The closing means 220 is not limited to the aforementioned mechanisms. As shown in FIG. 5, a mouse 101 can become trapped by the lid 130 and base panel 110 when the lid 130 moves to the closed position.

In some embodiments, the lid 130 comprises a first bar 131, a second bar 132 attached to the first end 131a of the first bar 131, and a third bar 133 attached to the second end 131b of the first bar 131 (e.g. the bars 131, 132, 133 form a U-shape or similar). The second bar 132 is pivotally attached to the second lip 120b (e.g., the outer end of the second lip 120b). The third bar 133 is pivotally attached to the third lip 120c (e.g., the outer end of the third lip 120c). In some embodiments, the first bar 131 is generally aligned with the first lip 120a, the second bar 132 is generally aligned with the second lip 120b, and the third bar 133 is generally aligned with the third lip 120c. The lid 130 is not limited to the aforementioned configurations. In some embodiments, the bottom edges 134 of the lid 130 (e.g., bottom edges of the bars 131, 132, 133) are jagged as shown in FIG. 1. In some embodiments, the lid 130 comprises a lid panel 135 and the bars 130 extend downwardly from the side edges of the lid panel 135 (e.g., see top view in FIG. 2).

Disposed on the base panel 110 is an alarm housing 150. In some embodiments, the alarm housing 150 is external to the enclosure formed by the lips 120. In some embodiments, the alarm housing 150 partially extends into the enclosure (e.g., see FIG. 1, FIG. 3, FIG. 5).

The system 100 further comprises a flange 160 (e.g., bait table) that extends from the alarm housing 150 into the enclosure formed by the lips 120. The flange 160 (e.g., bait table) can pivot between at least a first position wherein the flange 160 (e.g., bait table) hovers above the top surface 115 of the base panel 110 (e.g. a gap temporarily exists between the flange 160 (e.g., bait table) and the base panel 110) and a second position wherein the flange 160 (e.g., bait table) is pivoted to the base panel 110. The flange 160 (e.g., bait table) is biased in the first position, e.g., via a spring. Bait can be placed on the flange 160 to entice the rodent.

The flange 160 (e.g., bait table) has a top surface 165 and a bottom surface 166. A first half contact 170a is disposed on the bottom surface 166 of the flange 160 (e.g., bait table). A second half contact 170b is disposed on the top surface 115 of the base panel 110 and is aligned with the first half contact 170a such that when the flange 160 (e.g., bait table) is pivoted downwardly to the second position (e.g., by a rodent eating the bait on the flange 160), the first half contact 170a contacts the second half contact 170b.

A speaker 230 is disposed in the alarm housing 150. The speaker 230 is adapted to emit a sound, e.g., an alarm sound. Any appropriate alarm or notification sound may be employed. The sound from the speaker 230 may be emitted through a grill 158 disposed in the alarm housing 150 (e.g., see FIG. 2).

In some embodiments, the contacts 170 are each operatively connected to the closing means 220 (that controls the movement of the lid 130), e.g., via wiring 178. In some embodiments the contacts 170 are each operatively connected to the speaker 230. In some embodiments, when the contacts 170 contact each other, the contacts send an electrical signal to (a) the closing means 220 thereby activating the closing means 220 and causing the closing means 220 to move the lid 130 to the closed position and (b) the speaker 230 thereby activating the speaker 230 and causing the speaker 230 to emit the sound (e.g., alarm).

In some embodiments, the contacts 170 are each operatively connected to a microprocessor 210, the microprocessor 210 being operatively connected to each the closing means 220 and the alarm 230. In some embodiments, when the contacts 170 contact each other, the contacts send an input signal to the microprocessor 210 whereupon the microprocessor 210 sends a first output command to the closing means 220 thereby activating the closing means 220 and causing the closing means 220 to move the lid 130 to the closed position and a second output signal to the speaker 230 thereby activating the speaker 230 and causing the speaker 230 to emit the sound (e.g., alarm).

Figure 2:
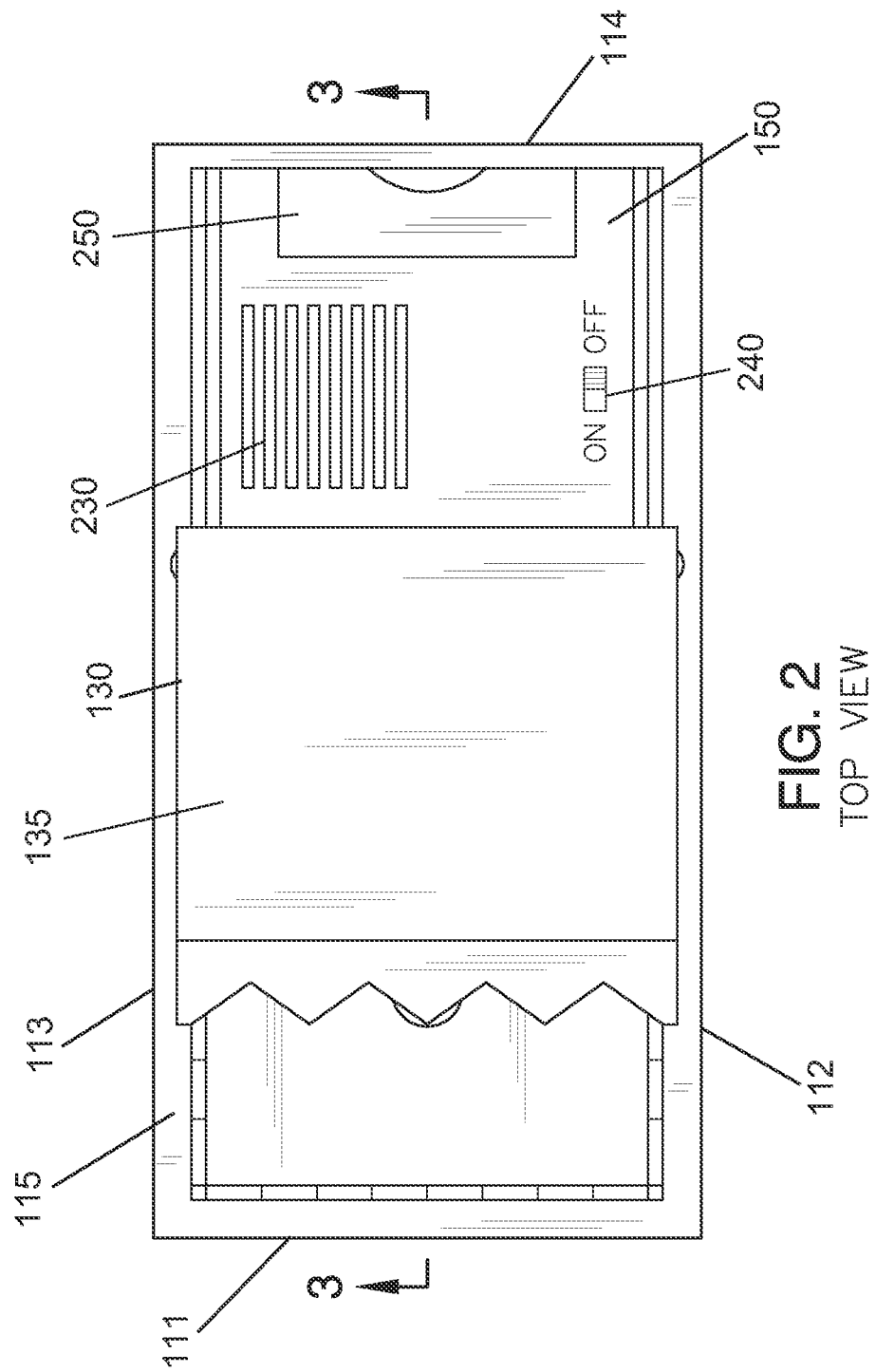
FIG. 2 is a top view of the system of the present invention.
Figure 3:
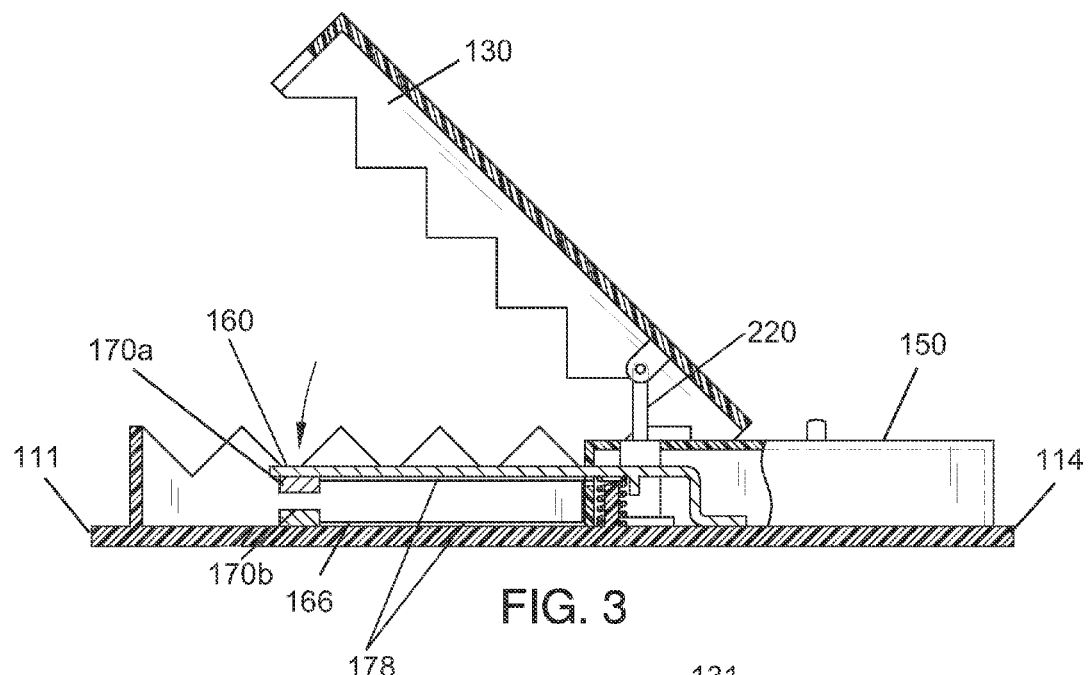
FIG. 3 is a side cross sectional view of the system of the present invention.
Figure 4:
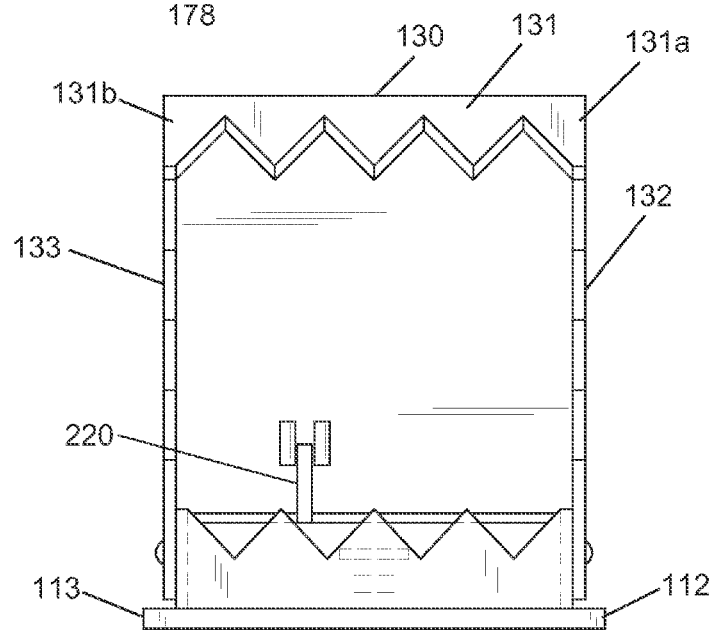
FIG. 4 is a front view of the system of the present invention.

As shown in FIG. 2, the system 100 further comprises a power switch 240 for turning on and off the system 100. Power switches are well known to one of ordinary skill in the art.

The system 100 further comprises a power source (e.g., battery). In some embodiments, the power source is housed in a battery compartment 250 disposed in the alarm housing 150.

As used herein, the term "about" refers to plus or minus 10% of the referenced number.

The disclosures of the following U.S. Patents are incorporated in their entirety by reference herein: U.S. Pat. No. D275,511; U.S. Pat. No. 4,517,557; U.S. Pat. No. 5,154,017; U.S. Pat. No. 5,184,416; U.S. Pat. No. 5,477,635; U.S. Pat. No. 6,137,415.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A rodent trap system (100) for alerting a user that a rodent (101) has been trapped, said system (100) consisting of:
   (a) a base panel (110) having a first end (111), a second end (112) adjacent to the first end (111), a third end (113) adjacent to the first end (111) and opposite the second end (112), and a top surface (115);
   (b) a first lip (120a) extending upwardly from the first end (111), a second lip (120b) extending upwardly from at least a portion of the second end (112) of the base panel (110), the portion being at or near the first end (111) of the base panel (110), and a third lip (120c) extending upwardly from at least a portion of the third end (113) of the base panel (110), the portion being at or near the first end (111) of the base panel (110), wherein the lips (120) create an enclosure;
   (c) a lid (130) with a lid panel (135) pivotally attached to the second lip (120b) and the third lip (120c), the lid (130) with the lid panel (135) can pivot between at least an open position and a closed position respectively allowing and preventing access to the enclosure formed by the lips (120) and the lid panel (135), the lid (130) is biased in the open position via a closing means (220); wherein the closing means are an actuator or solenoid which pulls a plunger (220) which triggers the closing operation;

(d) an alarm housing (150) disposed on the base panel (110), wherein a speaker (230) is disposed in the alarm housing (150), the speaker (230) is adapted to emit a sound when activated;

(e) a flange (160) extending outwardly from the alarm housing (110) into the enclosure formed by the lips (120), the flange (160) can pivot between at least a first position wherein the flange (160) hovers above the top surface (115) of the base panel (110) and a gap temporarily exists between the flange (160) and the base panel (110) and a second position wherein the flange (160) is pivoted to the base panel (110), the flange (160) is biased in the first position, (f) a first half contact (170*a*) disposed on a bottom surface (166) of the flange (160) and a second half contact (170*b*) disposed on the top surface (115) of the base panel (110), the second half contact (170*b*) is aligned with the first half contact (170*a*) such that when the flange (160) is pivoted downwardly to the second position the first half contact (170*a*) contacts the second half contact (170*b*), the contacts (170) are each operatively connected to the closing means (220) via electrical wiring and to the speaker (230), wherein when the contacts (170) contact each other the contacts (170) send an electrical signal to (a) the closing means (220) thereby activating the closing means (220) and causing the closing means (220) to move the lid (130) with the lid panel (135) to the closed position and (b) the speaker (230) thereby activating the speaker (230) and causing the speaker (230) to emit the sound, wherein the closing means is an actuator or a solenoid which pulls a plunger (220) which triggers the closing operation.

\* \* \* \* \*